United States Patent
Baudasse et al.

(10) Patent No.: US 8,770,521 B2
(45) Date of Patent: Jul. 8, 2014

(54) DEVICE FOR PROTECTING AN OPTICAL INSTRUMENT OF A SATELLITE

(75) Inventors: Yannick Baudasse, Grasse (FR); Stéphane Vezain, Mandelieu (FR)

(73) Assignee: Thales, Neuilly-sur-Seine (FR)

( * ) Notice: Subject to any disclaimer, the term of this patent is extended or adjusted under 35 U.S.C. 154(b) by 15 days.

(21) Appl. No.: 13/451,419

(22) Filed: Apr. 19, 2012

(65) Prior Publication Data
US 2012/0267482 A1 Oct. 25, 2012

(30) Foreign Application Priority Data

Apr. 21, 2011 (FR) .................................. 11 01257

(51) Int. Cl.
*B64G 1/54* (2006.01)
*B64G 1/00* (2006.01)
*B64G 1/22* (2006.01)
*B64G 1/66* (2006.01)

(52) U.S. Cl.
CPC *B64G 1/54* (2013.01); *B64G 1/222* (2013.01); *B64G 1/66* (2013.01)
USPC .................................... 244/171.6; 244/172.6

(58) Field of Classification Search
USPC ................... 244/171.7, 172.6, 121; 359/601, 359/611–613
See application file for complete search history.

(56) References Cited

U.S. PATENT DOCUMENTS

| | | | | | |
|---|---|---|---|---|---|
| 5,044,579 | A | * | 9/1991 | Bernasconi et al. | 244/158.3 |
| 6,199,988 | B1 | * | 3/2001 | Krawczyk | 359/601 |
| 7,144,123 | B2 | * | 12/2006 | Lungren et al. | 359/511 |
| 7,557,995 | B1 | * | 7/2009 | Lloyd | 359/642 |
| 8,056,858 | B2 | * | 11/2011 | Koehler et al. | 244/121 |
| 8,064,154 | B2 | * | 11/2011 | Bertuccio et al. | 359/894 |
| 8,083,407 | B2 | * | 12/2011 | Attina et al. | 378/203 |
| 2004/0201896 | A1 | * | 10/2004 | Lundgren et al. | 359/612 |
| 2010/0034358 | A1 | * | 2/2010 | Attina et al. | 378/156 |
| 2010/0270430 | A1 | * | 10/2010 | Koehler et al. | 244/121 |
| 2010/0284078 | A1 | * | 11/2010 | Bertuccio et al. | 359/507 |

FOREIGN PATENT DOCUMENTS

| | | |
|---|---|---|
| EP | 2151704 A1 | 2/2010 |
| EP | 2272761 A1 | 1/2011 |
| EP | 2287075 A2 | 2/2011 |
| JP | 3125697 A1 | 5/1991 |

* cited by examiner

*Primary Examiner* — Philip J Bonzell
(74) *Attorney, Agent, or Firm* — Baker & Hostetler LLP

(57) ABSTRACT

A device for protecting an optical instrument of a satellite comprises a body on which the optical instrument is mounted, said protection device having a folded-down position and a deployed position, and further comprising a plurality of rigid panels in the deployed position, the device forming a tube, the section of which is a polygon, arranged so as to protect the optical instrument, the longitudinal axis of the tube being substantially parallel with the focal axis of the optical instrument, the faces of the tube of polygonal section being formed by panels, in the folded-down position, said panels being held against the body of the satellite.

12 Claims, 8 Drawing Sheets

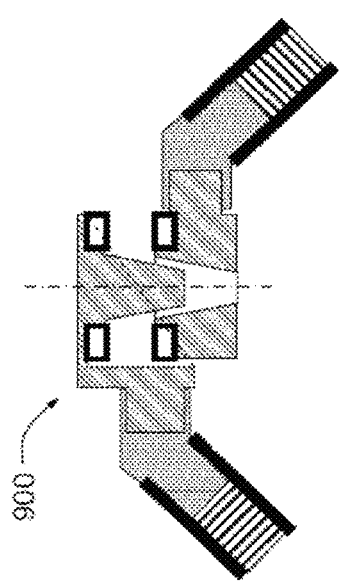
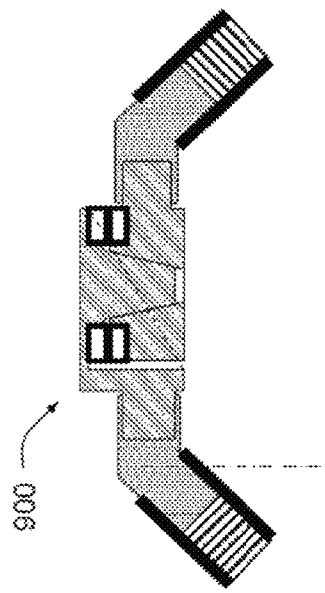
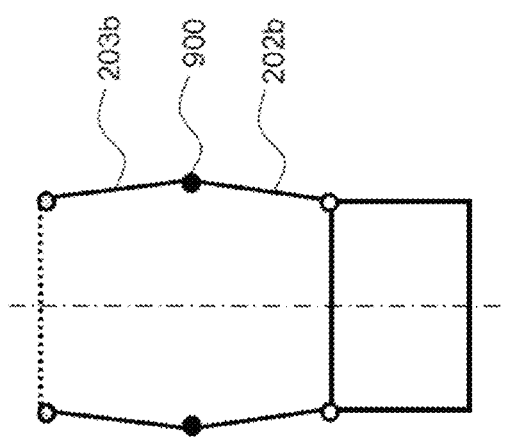
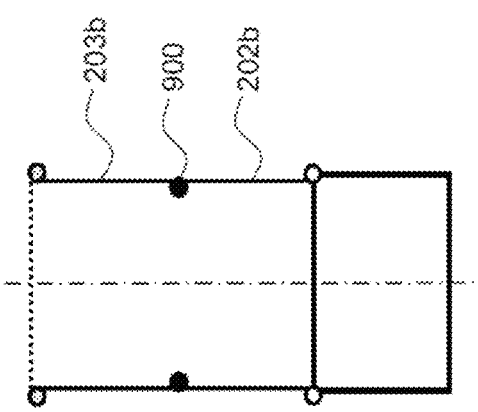

DEVICE FOR PROTECTING AN OPTICAL INSTRUMENT OF A SATELLITE

CROSS-REFERENCE TO RELATED APPLICATION

This application claims priority to foreign French patent application No. FR 1101257, filed on Apr. 21, 2011, the disclosure of which is incorporated by reference in its entirety.

FIELD OF THE INVENTION

The invention relates to the field of devices for protecting optical instruments of satellites.

BACKGROUND

The optical instruments of satellites that have at least one mirror have to be protected against the direct solar inputs on the surfaces of this mirror. The protection measures avoid optical disturbances and make it possible to regulate the temperature in proximity to the focal planes. This protection ensures the optical efficiency of the instruments.

These instruments are mounted on satellites that are placed in orbit by launch vehicles. Because of the small volume allotted under the nose cone of the launch vehicle, it is not possible to have a fixed protection device arranged in front of the optical instrument. It is therefore necessary to deploy this protection in flight, before the operational phase.

The technical problems encountered in the case of the deployment of large structures are primarily:

In the stored configuration: restricted volume for storing the structure, maintaining the integrity of this structure in the folded-down configuration, despite the mechanical and thermal stresses due to the launching of the space craft (notably the non-degradation of the very fragile thermal protection elements).

During deployment: the control of the deployment in terms of kinematics and the regulation of the speed in order to avoid shocks at the end of deployment.

In the deployed configuration: ensuring the stability and the rigidity in flight in order to guarantee the steerability of the craft, and ensuring a correct positioning of the structure in order to ensure that the solar input is limited and the field of view is not blocked.

FIG. 1 represents a device for protecting an optical instrument of a satellite according to the prior art. This device comprises a planar solar screen 101 positioned at a certain distance from the satellite 100. To use a planar screen it is necessary, in certain missions, to have a rotating element (the solar screen) of large size. This solution also poses problems: of reliability, of AOCS (Attitude Orbit Control System) disturbance, of disturbances in the optical measurements and of life span due to the mechanical elements implemented.

Furthermore, in order to avoid the solar inputs during certain periods, additional swivels of the solar screen are necessary, which further increases the complexity of this type of solution.

Thus, a close protection of the beam or beams is a solution that is more effective because it does not involve any movement throughout the operational phase.

To produce this type of jacketing protection, it is possible to use a number of technologies based on a deployable bearer structure for holding and positioning a flexible substrate.

The bearer structure may be inflatable and able to be made rigid in flight but controlling the deployment is complex because it is difficult to model by computation and complex to test. Furthermore, the rigidifying methods are irreversible and therefore do not allow for a model intended for flight to be tested on the ground.

Flexible protection devices are already known that are based on the use of a sheath of flexible cylindrical form, consisting of thermal protection sheets. This element is folded on itself during the stored phase then deployed and powered up. This solution presents a number of drawbacks. First of all, in storage, it is difficult to avoid the degradation of the membranes that form the thermal protection fabric. They are very fragile and are sensitive to mechanical stresses. The degraded membrane produces particles which, in deployment, are dispersed onto the instrument and degrade the optical efficiency thereof. Furthermore, to obtain compact storage, the flexible elements have to be folded and this folding is generally irreversible and has an embrittling effect on the membrane. Finally, the quantity of elements to be deployed, of moving parts and of frictions between components makes the deployment difficult to calculate and difficult to reproduce. The result of this is an overestimation of the energy needed when powering up the flexible element, in order to ensure a good final positioning for it, which can result in degradations on certain components and on the membrane.

SUMMARY OF THE INVENTION

The invention aims to overcome the abovementioned problems by proposing a device for protecting an optical instrument of a satellite that is sufficiently compact in the stored position, to allow for the satellite to be fitted under the nose cone of a launch vehicle, allowing for a controlled, regulated deployment, which, once deployed, offers effective protection against stray solar inputs and that has sufficient rigidity to enable the satellite to be controlled.

To this end, the subject of the invention is a device for protecting an optical instrument of a satellite comprising a body (201) on which the optical instrument is mounted, said protection device having a folded-down position and a deployed position, characterized in that it comprises a plurality of rigid panels (202, 203), in the deployed position, the device forming a tube, the section of which is a polygon, arranged so as to protect the optical instrument, the longitudinal axis (220) of the tube being substantially parallel with the focal axis of the optical instrument, the faces of the tube of polygonal section being formed by panels (202, 203), in the folded position, said panels (202, 203) being held against the body of the satellite.

Advantageously, one face has at least one first stage, a stage comprising: a first panel and a second panel, the first panel of the first stage being linked to the body of the satellite by a first articulation, the second panel being linked to the first panel by a second articulation, and the first stage being called last stage if the device has only a single stage.

Advantageously, the protection device comprises at least one additional stage, the first panel of the additional stage being linked to the second panel of the adjacent stage, the stage that is the most distant from the body being called last stage.

Advantageously, the protection device also comprises means for holding the panels in the folded-down position.

Advantageously, the optical instrument comprises a primary mirror, the device also comprising a secondary optical element fixed onto the second panels of the last stage so as to reflect the light towards the primary mirror.

Advantageously, the protection device also comprises solar generators fixed at the level of a row of articulations of the deployable structure.

Advantageously, the panels are solid.

Advantageously, the panels comprise a rigid frame on which a taut membrane is fixed.

Advantageously, the protection panels comprise active and passive control elements positioned directly on their surface, the device providing a thermal regulator function.

Advantageously, the protection device comprises deployable radiators fixed at the level of a row of articulations.

Advantageously, the protection device comprises peripheral locking means for maintaining the panels at the end of deployment.

The invention uses rigid elements so as to totally control all the deployment parameters. These rigid elements may consist of uniform panels of composite honeycomb type, or of rigid frames on which flexible membranes are stretched. In the folded-down position, the device according to the invention is sufficiently compact to be housed in the nose cone of a launch vehicle.

The deployment of the device can be regulated, synchronized or sequenced and therefore controlled. The deployment kinematics can be modelled and a correlation by testing is feasible. The deployment can be done on the ground and is reproducible in flight.

The solar inputs are "blocked" by chicanes consisting of elements of each panel that mutually overlap. It is also possible to produce the light-tightness by edge seals consisting of the same thermal substrate as that covering the deployable structure, the plays of which are perfectly controlled and reproducible.

It is also possible to incorporate solar cells, or any other (active or passive) thermal regulation element, on certain panels.

It is also possible to incorporate deployable elements on certain panels such as solar generators or radiators.

BRIEF DESCRIPTION OF THE DRAWINGS

The invention will be better understood and other advantages will become apparent on reading the detailed description, given as a nonlimiting example, and with the help of the figures in which:

FIGS. 9a to 9c represent a fifth variant embodiment of the protection device according to the invention comprising a locking device.

DETAILED DESCRIPTION

Figure 1:
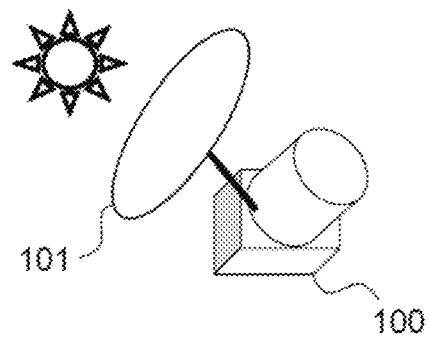
FIG. 1, already presented, represents a protection device according to the prior art.

The solution of the invention uses rigid elements whose technical characteristics are perfectly known, controlled and reproducible. This solution makes it possible to compactly and rigidly store a device of polygonal form, that is deployable, which can be as long as several tens of meters in length.

The device comprises articulated panels forming, in the deployed configuration, a polygonal tube. To obtain this form, each face of the polygon consists of a subset of panels linked together by self-powered articulations, each subset being linked, at its base, to the satellite by a root section articulation and to the other subsets at its opposite end, as well as, if necessary, by peripheral locking systems. These links at the ends and at the periphery make it possible to obtain a closed structure and therefore ensure an overall rigidity of the assembly.

Potentially, because this structure is closed by a set of powered articulations, it is possible to control the deployment speed of all the structures by a single regulation system positioned at the root section of the baffle. The synchronization of the movements is obtained by a set of cables and pulleys linking the different articulations to the regulator.

FIG. 2 represents a first exemplary implementation of the protection device according to the invention. In this nonlimiting example, the deployed device is a tube of hexagonal section. The number of faces of the tube may be greater or lesser.

The device of the example comprises six faces. Each of the faces comprises a first panel 202 linked to the body 201 of the satellite via a first articulation 211 and a second panel 203 linked to the first panel 202 via a second articulation 212.

Articulations 213 make it possible to securely hold panels belonging to adjacent faces in the deployed position.

The tube has a longitudinal axis 220.

Figure 2A:
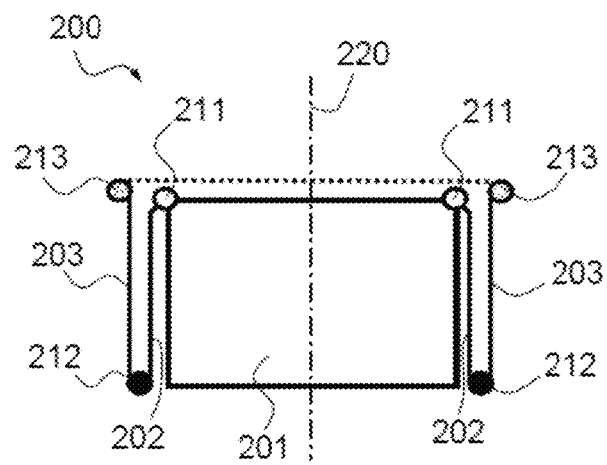
FIGS. 2a to 2d represent a first exemplary implementation of the protection device according to the invention.

FIG. 2a presents a cross-sectional view of the satellite with the protection device in the folded-down position. The panels 202, 203 of each face are held against the body 201 of the satellite.

Figure 2B:
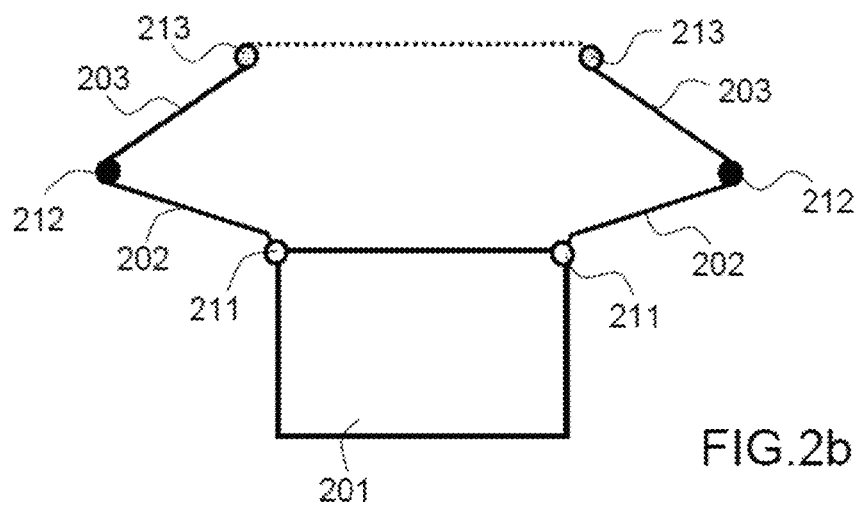

FIG. 2b presents a cross-sectional view of the satellite with the protection device in the intermediate position. The first panels 202 pivot relative to the body of the satellite 201 about first articulations 211. The second panels 203 pivot relative to the first panels 202 about second articulations 212. The rotations take place on axes orthogonal to the longitudinal axis 220.

Figure 2C:
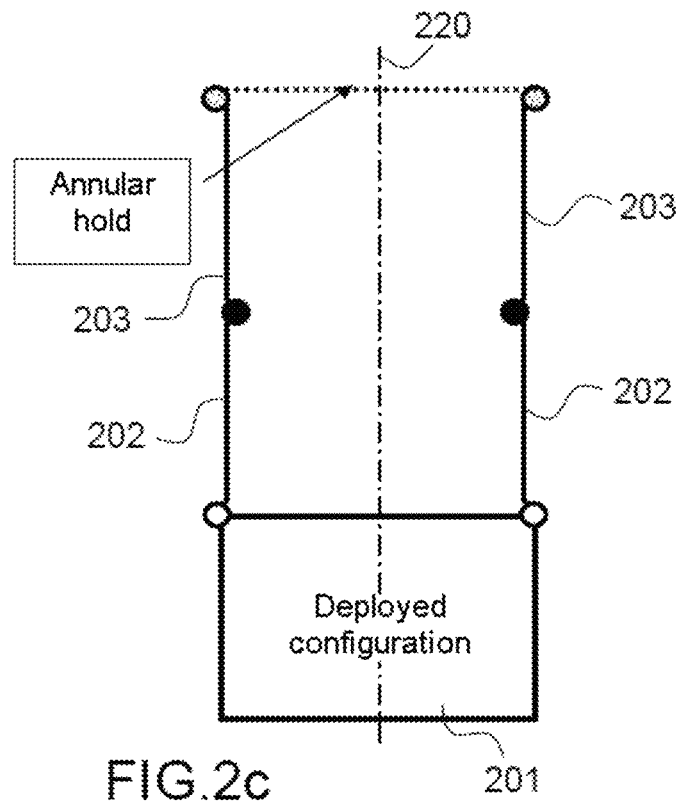
Figure 4:
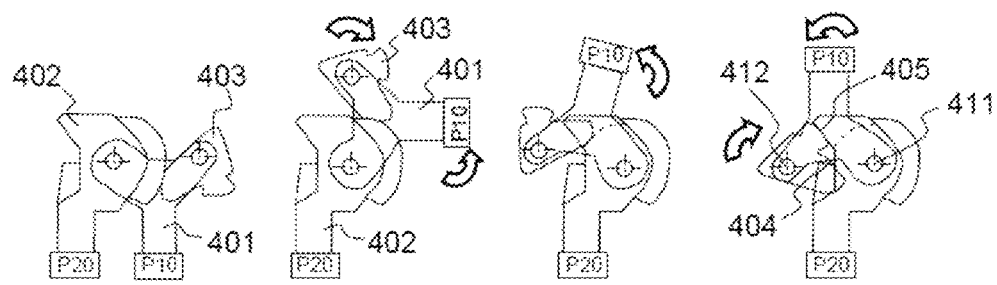
FIG. 4 represents an exemplary articulation for linking the panels together.

FIG. 2c presents a cross-sectional view of the satellite with the protection device in the deployed position. The panels 202, 203 form a cylinder of hexagonal section whose longitudinal axis 220 substantially coincides with the focal axis of the optical instrument. The articulations have the property of being able to be locked in the deployed configuration as will be explained later in the description (FIG. 4). Since the panels are all linked to one another, these multiple locks ensure a significant overall rigidity. Additional locking systems, an example of which is represented in FIG. 9, can provide even greater rigidity by linking the subsets of panels together in the central region.

Figure 2D:
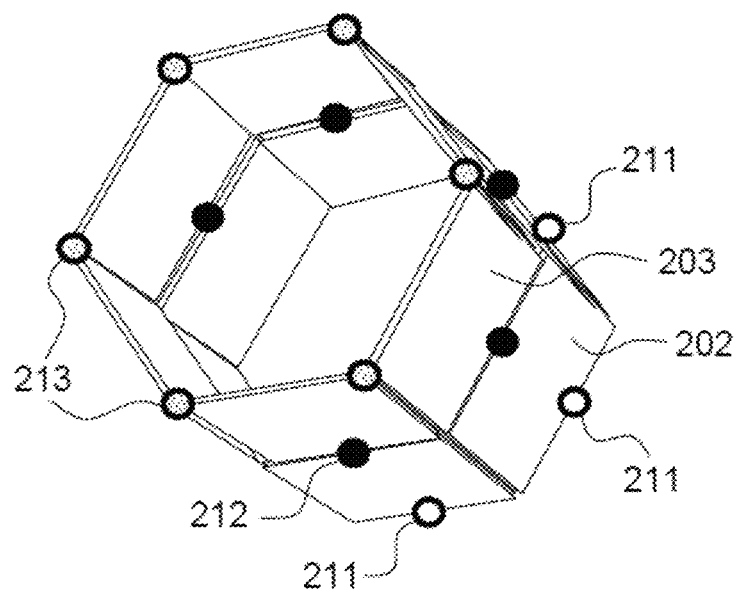

FIG. 2d is a perspective view of the protection device in the deployed position. In this figure, the articulations 213 can be distinguished which make it possible to securely hold the panels belonging to adjacent faces, as well as the locking systems used to link the panel subsets.

The first articulations 211 are placed in the middle of the edge adjacent to the body of the satellite 201. The second articulations 212 are placed in the middle or in the corners of the adjacent edge between the first panels 202 and the second panels 203.

Figure 3:
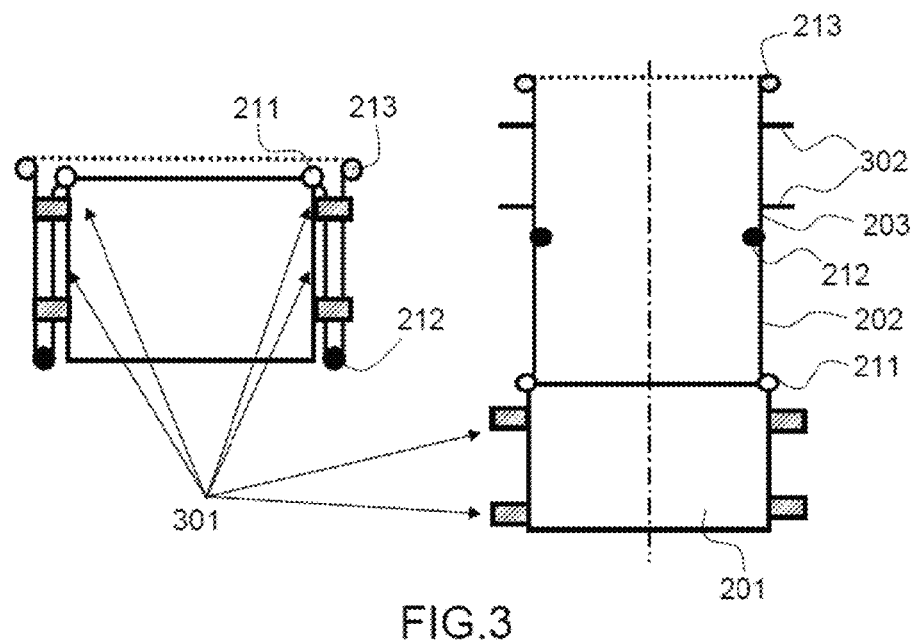
FIG. 3 represents the positioning of means for holding the panels in the folded-down and deployed position in the first exemplary implementation of the protection device according to the invention.

According to one feature of the invention, the device comprises means for holding the panels in the folded-down position. FIG. 3 represents the positioning of means for holding the panels in the folded-down position in the first exemplary implementation of the protection device according to the invention. In this exemplary implementation, the holding means comprise stacking feet 301 and stacking ties 302.

The stacking feet 301 are tripods or single-piece fittings fixed onto the body 201 of the satellite. The stacking ties 302 are positioned on the second panel 203. In the example, each subset of panels is held pressed against the stacking feet by cross ties held at their respective ends by tensioning nuts.

In the folded-down position, the ties 302 are retained by release nuts positioned on the stacking feet 301. The panels are thus held stored against the body 201 of the satellite. The ties of one face cross the first panel 202 of this face.

To switch to the deployed position, the feet release the ties which are then projected on the external face of the last panels 203 of the device. In the deployed position, the ties are positioned on the external face of the second panel 203 so as not to be within the field of vision of the optical instrument.

FIG. 4 represents an exemplary articulation for linking the panels together.

The articulation 212 for example, comprises a first part 401 with a first end P10 linked, for example, to a first panel 202, and a second part 402 with a second end P20 linked to a second panel 203. The first part 401 is linked to the second part 402 and is mobile in rotation about a first axis 411 relative to the second part 402. The second part 402 is also powered in rotation about a first axis 411 and relative to the first part 401, by a spiral spring which is not represented. The articulation comprises a third part 403 linked to the first part 401 and powered in rotation by a spring which is not represented relative to the first part 401 according to a second axis 412. The third part 403 has an anti-return abutment 405 preventing the rotation of the first part 401 in the reverse direction once the first part 401 comes into contact on the abutment 404 of the second part 402.

The articulations provide the panels with powering, driving and locking functions.

For an articulation used to link a first panel to the body of the satellite, the first end P10 is linked to the first panel 202 and the second end P20 is linked to the body of the satellite 201.

In the folded-down position, the panels are parallel. In the deployed position, the second panel pivots about the first axis of rotation 411, until it is substantially in extension to the first panel 202.

According to one embodiment of the invention, the protection device comprises an additional stage. The first panel of the additional stage is then linked to the second panel of the adjacent stage. The stage that is the most distant from the body of the satellite 201 is called last stage. It is thus possible to assemble a number of stages. Thus, it is possible to produce a stack of several similar stages while preserving a good overall rigidity.

Figure 5:
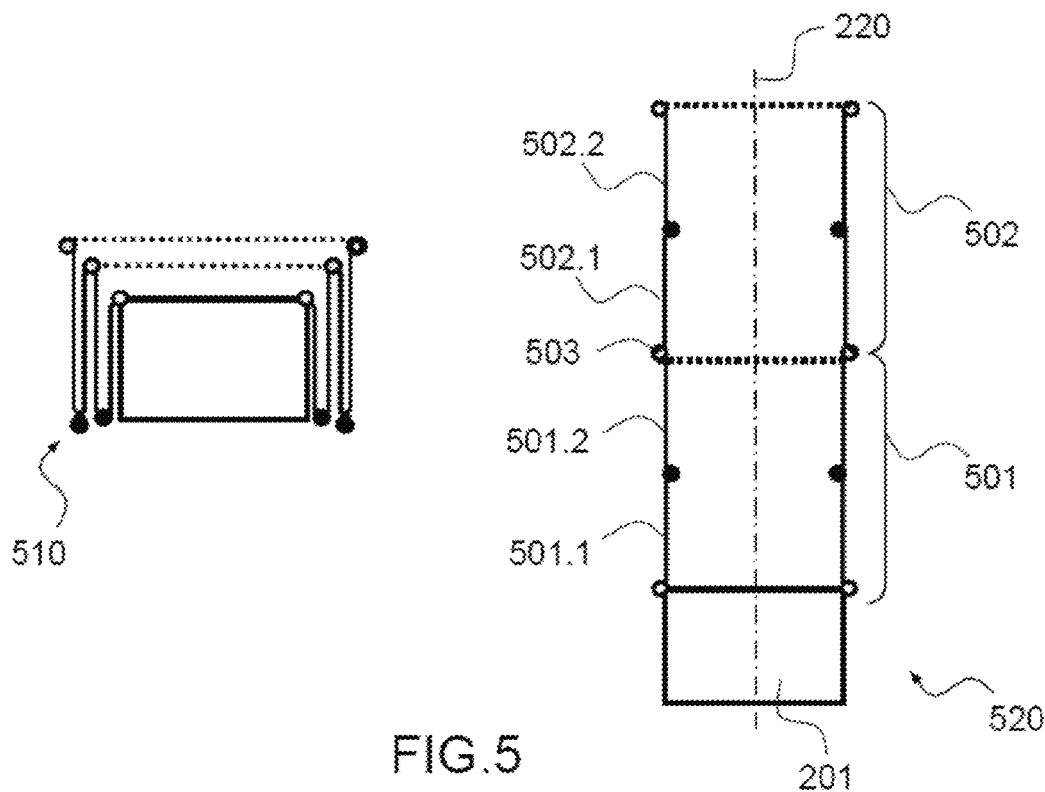
FIG. 5 represents a first variant embodiment of the protection device according to the invention comprising two panel stages.

FIG. 5 represents a first variant embodiment of the protection device according to the invention comprising two stages 501, 502 of panels. The two stages 501, 502 have a similar structure: two panels 501.1, 501.2, 502.1, 502.2 linked by an articulation 503. The two stages are linked by an articulation.

In the folded-down position 510, the set of panels is held against the body of the satellite in the same way as previously by a system of cross stacking ties which will be positioned, in the deployed position, on the external faces of the last panels 502.2 of the last stage 502. The stages are deployed in succession in a similar manner. In the deployed position 520, the two stages 501, 502 form a cylinder.

In the case of a single stage whose panels have substantially the same height as the body of the satellite, a protection device is obtained whose height is equivalent to two times that of the body of the satellite.

In the case of two stages whose panels have substantially the same height as the body of the satellite, a protection device is obtained whose height is equivalent to four times that of the body of the satellite.

According to a variant embodiment of the invention, the optical instrument comprises a primary mirror. The protection device also comprises an optical element, for example a secondary mirror fixed to the second panels of the last stage so as to reflect the light towards the primary mirror, in the deployed position. It is also possible to have a secondary mirror mounted on a fine pointing system, making it possible to correct the defects of the deployable bearer structure.

The protection device therefore also has the advantage of being able to include, in its top part, an optical element, which, because of this, becomes deployable like the structure as a whole.

Figure 6:
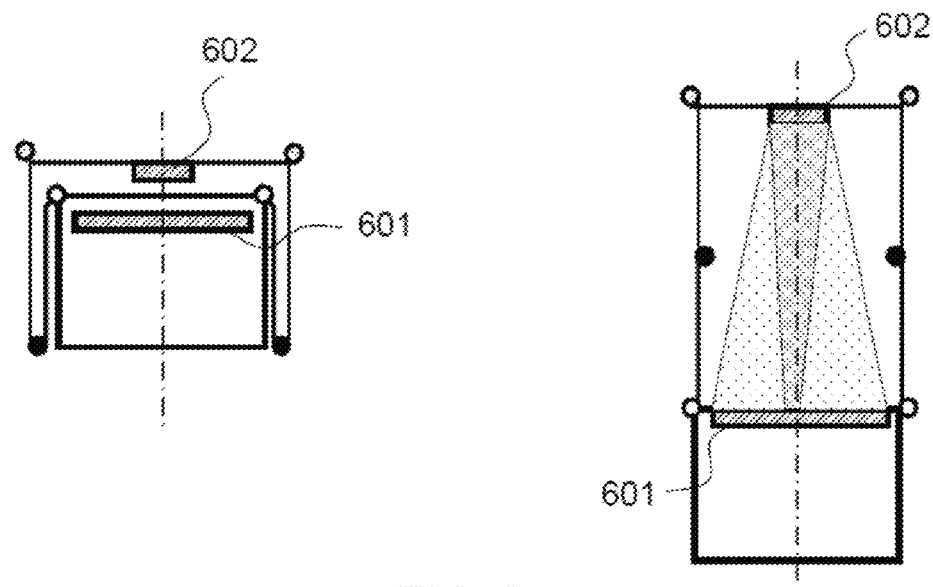
FIG. 6 represents a second variant embodiment of the protection device according to the invention comprising a secondary optic.

FIG. 6 represents a second variant embodiment of the protection device according to the invention comprising a secondary optic.

In the folded-down position, the secondary mirror is held facing the primary mirror of the optical instrument.

In the deployed position, the secondary mirror is placed at a distance from the primary mirror.

Figure 7:
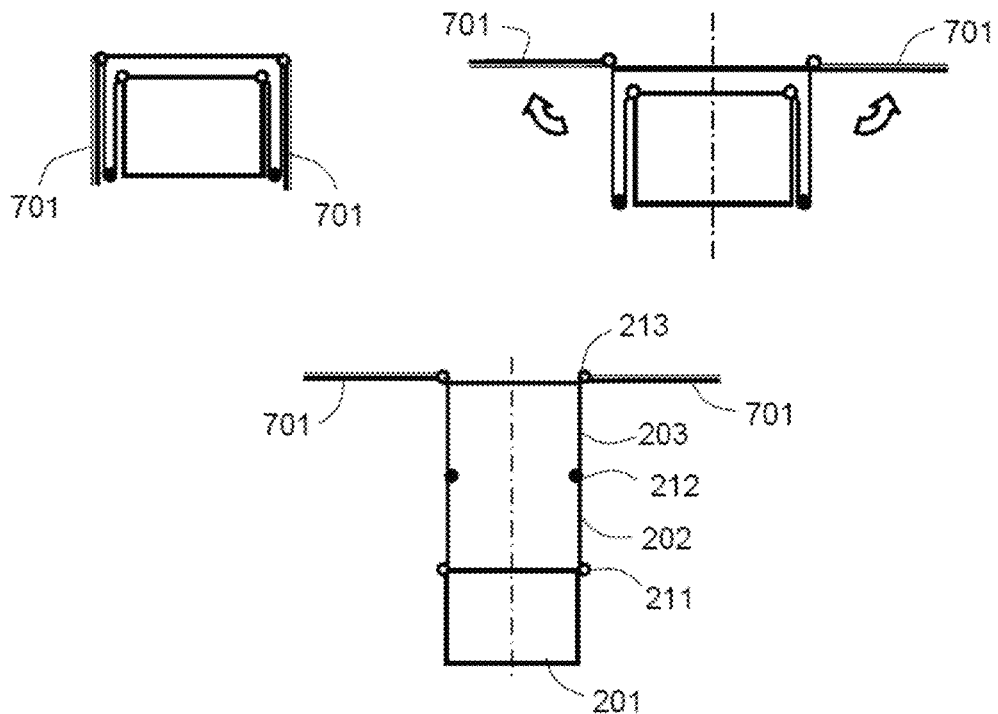
FIG. 7 represents a third variant embodiment of the protection device according to the invention comprising solar generators.

FIG. 7 represents a third variant embodiment of the protection device according to the invention comprising solar generators. According to another variant embodiment of the invention, the optical instrument also comprises solar generators fixed at the level of a row of articulations of the deployable structure and, in the case represented, at the end of the second panels of the last stage.

In the folded-down position, the solar generators or solar panels are held against the secondary panels to which they are linked by an articulation.

The solar panels can be deployed independently of the protection device. Each of the solar panels is deployed by rotation about the articulation linking it to the second panel. They can operate from the start of the mission, the protection device being able to be opened in a second stage.

In the deployed position, the solar generators are preferentially perpendicular to the longitudinal axis of the tube, but may be oriented by any angle according to the orientation of the sun relative to the satellite.

Figure 8A:
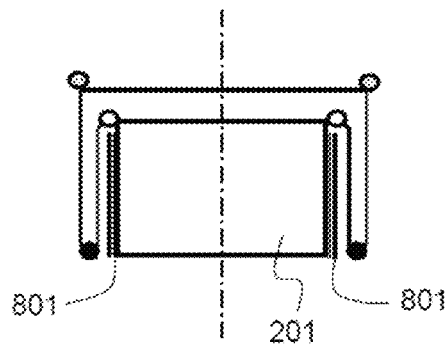
FIGS. 8a to 8c represent a fourth variant embodiment of the protection device according to the invention comprising deployable radiators.
Figure 8B:
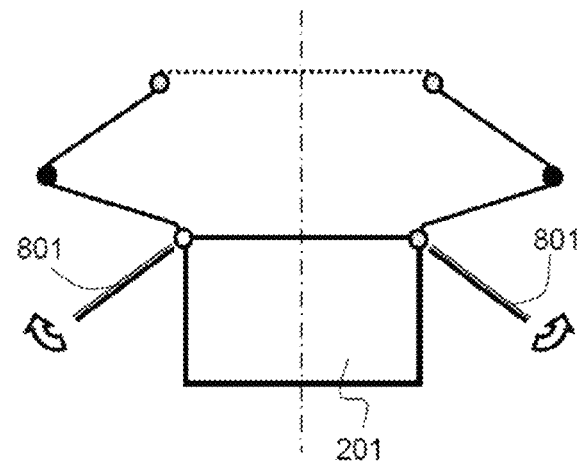
Figure 8C:
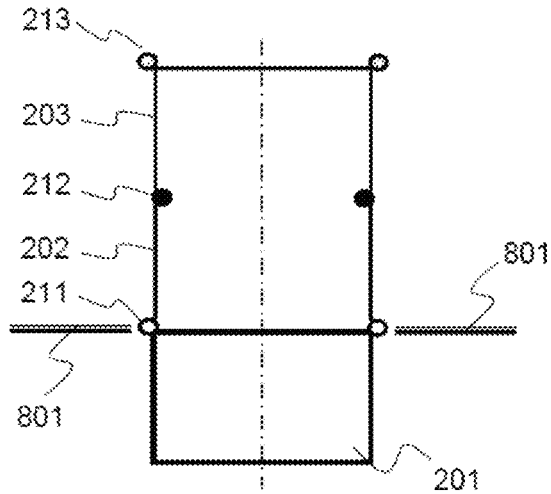

FIG. 8 represents a fourth variant embodiment of the protection device according to the invention comprising deployable radiators. According to another variant embodiment of the invention, the deployable structure also comprises deployable radiators 801 fixed at the level of one of the rows of articulations of the deployable structure and preferentially, either in proximity to the primary optics, at the level of the rows of root-section articulations 211, or in proximity to the secondary optics, at the level of the rows of articulations 213 of the panels of the last stage.

In the folded-down position, the deployable radiators 801 are held against the secondary panels to which they are linked by an articulation.

Each of the deployable radiators 801 is deployed by rotation about the articulation linking it to the different panels. They can operate from the start of the mission, in the case where they are situated on the last panels, the protection device being able to be opened in a second stage.

In the deployed position, the deployable radiators 801 are preferentially perpendicular to the longitudinal axis of the tube, but can be oriented by any angle according to the orientation of the space relative to the satellite.

Advantageously, the protection device also comprises peripheral locking means ensuring a good overall rigidity by holding the panels at the end of deployment.

Figure 9A:
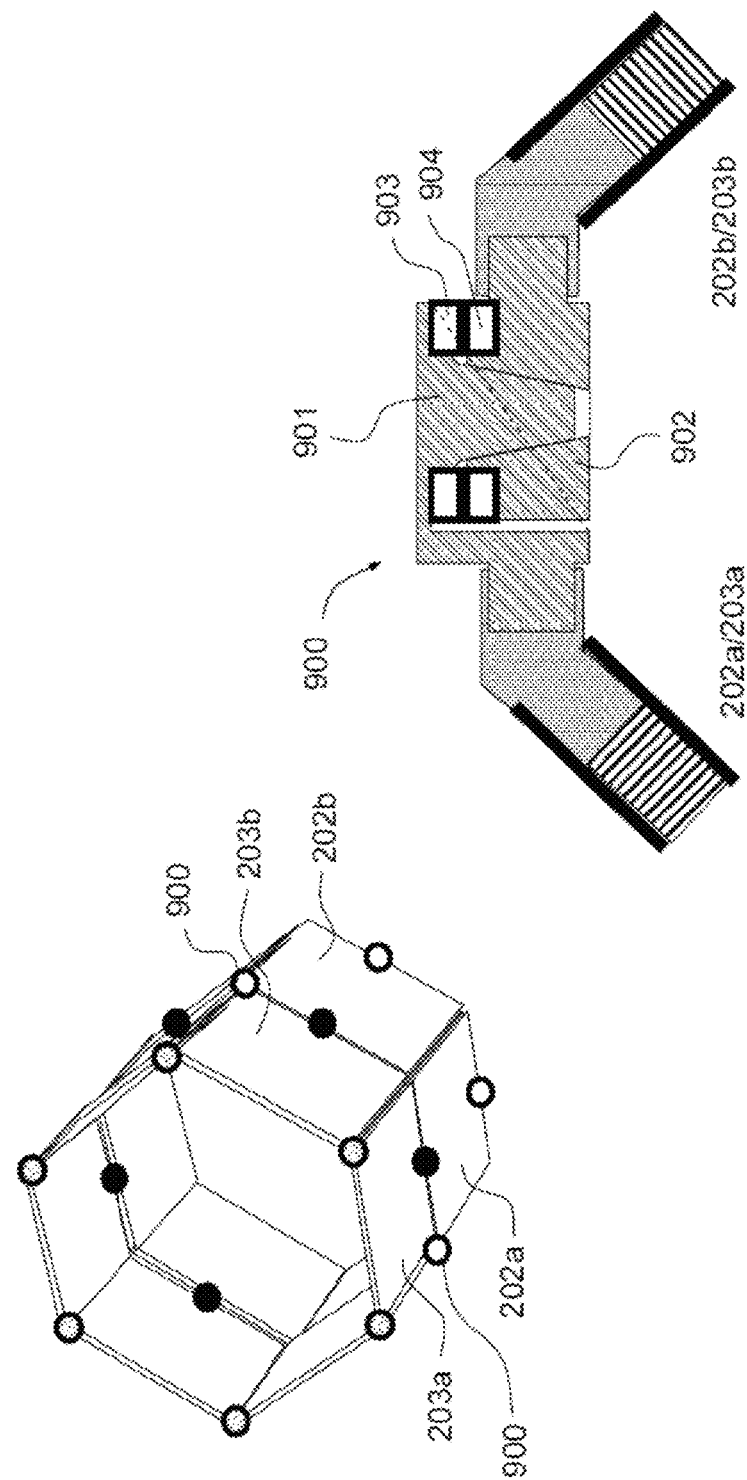

FIGS. 9a, 9b, 9c represent an exemplary embodiment of a locking device based on a permanent magnet design. As an example, FIG. 9a represents the peripheral position of the systems for locking the panels at the end of deployment. FIG. 9b represents the panels in the "end of deployment" configuration and FIG. 9c represents the panels in the deployed and locked configuration. The panel subset 202a, 203a is equipped with a fitting with a male tapered end 901 and panel subset 202b, 203b is equipped with a fitting with a female tapered end 902. Each of the two fittings is in turn equipped with a permanent magnet 903, 904, respectively attached to each fitting. At the end of deployment, the articulation systems enable the ends of the panels 202a, 203a and 202b, 203b to be positioned facing one another so that the fitting with male tapered end 901 fits into the fitting with female tapered end 902. Under the effect of the magnets 903 and 904 and the resultant magnetic attraction, the two fittings come into contact and then remain held against one another.

According to a variant of the invention, the panels may consist of a composite panel of honeycomb type or of a semi-rigid element of reinforced composite steel plate type.

According to a variant of the invention, the panels comprise a rigid frame on which a taut membrane is fixed.

In order to guarantee the good efficiency of the instruments, the protection device may also provide the thermal regulator function, by virtue of the addition of active and passive control elements positioned directly on the surface of the panels.

The components allowing for the (active and passive) thermal control are linked to a stable and controlled surface and are therefore protected from the mechanical stresses in the folded-down position and during deployment.

The different embodiments can be mutually combined. It is possible to have a device comprising a number of stages with solar generators, a secondary optic and a thermal regulation system.

The invention claimed is:

1. A protection device for protecting an optical instrument configured to be mounted on a body of a satellite, said protection device comprising:
a plurality of rigid panels having a folded-down position and a deployed position, said rigid panels configured to be held against the body of the satellite in the folded-down position, and forming a tube of polygonal section in the deployed position, the rigid panels in the deployed position arranged so as to protect the optical instrument, wherein a longitudinal axis of the tube is substantially parallel with a focal axis of the optical instrument, and wherein each face of the polygonal section consists of a subset of the plurality of rigid panels, the rigid panels being linked together by self-powered articulations.

2. The protection device according to claim 1, further comprising means for holding the panels in the folded-down position.

3. The protection device according to claim 1, wherein one face of the polygon has at least one first stage, a stage comprising: a first panel and a second panel, the first panel of the first stage being linked to the body of the satellite by a first articulation, the second panel being linked to the first panel by a second articulation, and the first stage being called last stage if the device has only a single stage.

4. The protection device according to claim 3, wherein the first articulation is placed in a middle of an edge configured to be adjacent to the body of the satellite and the second articulation is placed in a middle or in a corner of an adjacent edge between the first panel and the second panel.

5. The protection device according to claim 4, wherein the second articulation comprises a first part linked to the first panel and a second part linked to the second panel.

6. The protection device according to claim 5, wherein the first part is linked to the second part and is mobile in rotation about a first axis relative to the second part, and further comprising a third part linked to the first part and powered in rotation relative to the first part according to a second axis.

7. The protection device according to claim 6, wherein the third part has an anti-return abutment preventing the rotation of the first part in the reverse direction once the first part comes into contact on the anti-return abutment of the second part.

8. The protection device according to claim 1, further comprising solar generators fixed at the level of a row of articulations of the deployable structure.

9. The protection device according to claim 8, wherein the panels comprise a rigid frame on which a taut membrane is fixed.

10. The protection device according to claim 9, further comprising active and passive control elements positioned directly on a surface of the rigid panels for providing a thermal regulator function.

11. The protection device according to claim 10, further comprising deployable radiators fixed at the level of a row of articulations.

12. The protection device according to claim 11, further comprising peripheral locking means for maintaining the panels at the end of deployment.

* * * * *